(No Model.)

D. P. SIMS.
PNEUMATIC TIRE.

No. 515,134. Patented Feb. 20, 1894.

WITNESSES

David P. Sims.
INVENTOR by

Attorney

UNITED STATES PATENT OFFICE.

DAVID P. SIMS, OF LINCOLN, NEBRASKA.

PNEUMATIC TIRE.

SPECIFICATION forming part of Letters Patent No. 515,134, dated February 20, 1894.

Application filed March 2, 1893. Serial No. 464,390. (No model.)

*To all whom it may concern:*

Be it known that I, DAVID P. SIMS, a citizen of the United States of America, residing at Lincoln, in the county of Lancaster and State of Nebraska, have invented certain new and useful Improvements in Pneumatic Tires; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The object of this invention is to provide means for preventing a pneumatic tire from being punctured; and it consists in attaching a flat chain to a non-elastic strip so that the links of the chain will be held together, and when in this condition be embedded in the material of which the tire is made so as not to impair the resiliency of the same; and the invention further consists in the construction and combination of the parts, as will be hereinafter fully set forth, and particularly pointed out in the claims.

Figure 1:
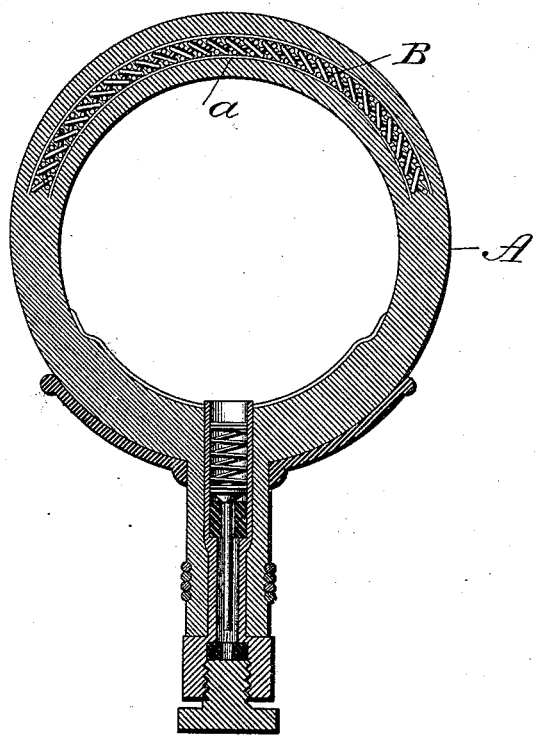
Figure 2:
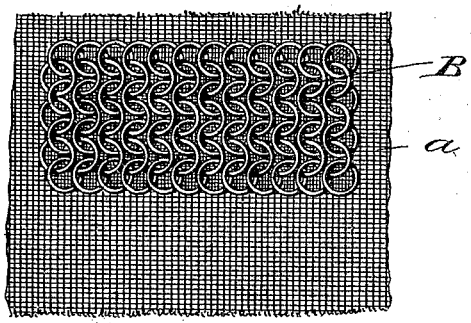

In the accompanying drawings, forming part of this specification, Figure 1 is a sectional view of a tire constructed in accordance with my invention, and Fig. 2 is a detail view showing a portion of the chain attached to a non-elastic strip.

A designates a pneumatic tire, which is made up of rubber reinforced in the usual manner, to which tire my improvements are shown applied.

*a* designates a strip or piece of canvas, and B a chain which is made up of rings or links connected to each other to provide a flat chain of a width sufficient to extend a short distance beyond the tread portion of the tire where it is likely to be punctured. In practice these links will be made of a suitable metal, preferably of aluminum or alloys thereof, on account of its lightness.

In making a tire with my improvements applied I first take a flat chain belt of greater length than the circumference of the tire and stitch it to a canvas or textile strip so that the links of the chain will be compressed or brought close together, and these parts are molded in the rubber forming the tire by vulcanizing. A tire thus constructed will be expansible under the air pressure, and a thorough protection is afforded against the same being punctured.

If desired the tire may have a larger amount of rubber in the tread portion.

I am aware that prior to my invention it has been proposed to provide pneumatic tires with a protecting band made up of a number of plates of metal connected to each other or overlapping to prevent the tire being punctured, and I do not claim such construction, as such obviously impairs the elasticity and resiliency of the tire; and I am also aware that it has been proposed to mold wire cloth in rubber for the purpose of protecting said rubber.

What I claim as my invention is—

1. In combination with a metallic rim and air inlet valve of a pneumatic tire, comprising a protecting band or strip made up of associated links which are attached to a fabric strip so as to hold the links in close engagement with each other longitudinally and laterally, the flat chain or protecting band so constructed being embedded in the rubber of the tire, substantially as shown.

2. In combination with the rim and air inlet valve, a pneumatic tire comprising a flexible protection strip made up of a series of links held so as to be compressed, said protection strip being embedded in the tread portion of the tire, for the purpose set forth.

3. In combination with a wheel having a concave rim, of a pneumatic tire comprising in part a flexible protection chain or strip made up of links which are attached to a fabric strip in such a manner that the links are brought close together so as to overlap the adjacent links, the chain and fabric strip being molded in the center of that portion of the tire which will form the tread, substantially as shown.

4. A pneumatic tire, consisting of a vulcanized rubber tube having molded therein a protection strip made up of a metallic fabric composed of links or rings which interlock both longitudinally and laterally and a strip or strips of loosely woven textile fabric to which the metallic fabric is connected so that the links will be crowded together, substantially as set forth.

In testimony whereof I affix my signature in presence of two witnesses.

DAVID P. SIMS.

Witnesses:
H. C. RUSSELL,
C. M. CRAWFORD.